(12) United States Patent
Green

(10) Patent No.: US 7,419,691 B2
(45) Date of Patent: Sep. 2, 2008

(54) FOOD SUPPLEMENT FORMULATION

(75) Inventor: Lonny S. Green, Glen Allen, VA (US)

(73) Assignee: Renaton LLC, Glen Allen, VA (US)

( * ) Notice: Subject to any disclaimer, the term of this patent is extended or adjusted under 35 U.S.C. 154(b) by 686 days.

(21) Appl. No.: 10/274,711

(22) Filed: Oct. 21, 2002

(65) Prior Publication Data
US 2004/0076720 A1 Apr. 22, 2004

(51) Int. Cl.
*A23L 2/02* (2006.01)
(52) U.S. Cl. ............... 426/72; 426/74; 426/599; 426/615; 426/648; 426/656

(58) Field of Classification Search ............... 426/72, 426/74, 615, 648, 656, 599
See application file for complete search history.

(56) References Cited

U.S. PATENT DOCUMENTS

| 6,703,056 B2 * | 3/2004 | Mehansho et al. | 426/74 |
| 2003/0018009 A1 * | 1/2003 | Collins | 514/52 |
| 2003/0228393 A1 * | 12/2003 | Zhao | 426/74 |

* cited by examiner

*Primary Examiner*—Helen F Pratt
(74) *Attorney, Agent, or Firm*—Fraser Clemens Martin & Miller LLC; Donald R. Fraser

(57) ABSTRACT

A food supplement formulation, comprises L-methionine; L-arginine; zinc; selenium; Echinacea; cranberry; ginkgo; and usnea barbata.

27 Claims, No Drawings

FOOD SUPPLEMENT FORMULATION

FIELD OF THE INVENTION

The present invention relates generally to a food supplement formulation. More particularly, the invention is directed to a food supplement formulation containing natural ingredients which can be important in maintaining good health and the proper functioning of the bladder.

BACKGROUND OF THE INVENTION

Natural compounds, including herbal formulations can provide a healthy supplement to the daily human diet. Certain compounds are useful for proper functioning of the human body, but are not contained in appropriate quantities in the daily diets of many people. Thus, formulations made from these compounds are useful for supplementing their intake in the human diet.

Urinary tract infections are among the most common conditions causing persons to seek relief through medical care. A majority of females experience a urinary tract infection (UTI) at some point in their lives, and at least a third of all women who experience a UTI will experience recurrences during the following year. The pathogenesis of UTI is multi-factorial, and is influenced by both host factors and by the properties of the infecting uropathogens. While humans are continuously exposed to microorganisms, it is relatively uncommon that those microorganisms cause damage to their host. The outcome of the interactions between the host and the normal internal flora is dependent upon specific properties inherent in each member. Host defense mechanisms may be divided into constitutive defenses and inducible defenses. Anatomic barriers to infection are one type of constitutive defense, while an immune response to a pathogen is an inducible defense. Increased bacterial virulence appears to be necessary to overcome strong host resistance and, conversely, bacteria with minimal virulence characteristics are able to infect those who are significantly compromised.

It would be desirable to prepare a food supplement formulation which might promote generally good health and simultaneously promote host resistance to bacterial virulence.

SUMMARY OF THE INVENTION

Accordant with the present invention, there surprisingly has been discovered a food supplement formulation, comprising, L-methionine; L-arginine; zinc; selenium; Echinacea; cranberry; ginkgo; and usnea barbata.

The food supplement formulation according to the present invention is particularly useful as a human dietary supplement.

DESCRIPTION OF THE PREFERRED EMBODIMENT

The present invention is directed to a food supplement formulation, comprising, L-methionine; L-arginine; zinc; selenium; Echinacea; cranberry; ginkgo; and usnea barbata.

L-methionine is a well-known amino acid, which is useful for treatment of UTI due to its influence on bacterial cytoadherence. L-methionine may be present in the inventive formulation at a concentration ranging from about 0.5 to about 4 weight percent. Preferably, L-methionine is present at a concentration of about 2 weight percent.

L-arginine is a well-known amino acid, which aids the body's immune system. L-arginine may be present in the inventive formulation at a concentration ranging from about 0.5 to about 4 weight percent. Preferably, the concentration of L-arginine is about 2 weight percent.

Zinc is a well-known essential mineral, which supports a healthy immune system, and assists wound healing and DNA synthesis. Zinc may be present in the inventive formulation at a concentration from about 0.5 to 7 weight percent. Preferably, the concentration of zinc is about 4 weight percent.

Selenium is a well-known essential mineral, useful in the development and functioning of the body's white blood cells, and for the normal functioning of the immune system. Selenium may be present in the inventive formulation at a concentration from about 2 to about 18 weight percent. Preferably, the concentration of selenium is about 4 weight percent.

Echinacea is a well-known herb, useful for the treatment of upper respiratory illnesses, and as an antiseptic. Echinacea may be present in the inventive formulation at a concentration from about 3 to about 30 weight percent. Preferably, the concentration of echinacea is about 10 weight percent.

Cranberry is a well-known fruit, which acts, inter alia, as an astringent. Cranberry may be present in the inventive formulation at a concentration from about 20 to about 70 weight percent. Preferably, the concentration of cranberry is about 62 weight percent.

Ginkgo biloba is a well-known herb, useful as an antioxidant. Ginkgo may be present in the inventive formulation at a concentration from about 2 to about 12 weight percent. Preferably, the concentration of ginkgo is about 4 weight percent.

Usnea barbata is a well-known organic material, useful as an anti-inflammatory agent, and for the treatment of upper respiratory infections. Usnea barbata may be present in the inventive formulation at a concentration from about 4 to about 22 weight percent. Preferably, the concentration of usnea barbata is about 12 weight percent.

The aforementioned ingredients may be dried, ground, and mixed together by conventional techniques. Thereafter, the powder mixture may be pressed and formed into tablets, or placed in gelatin capsules, for oral administration. The inventive food supplement formulation may also contain conventional food supplement fillers and extenders such as, for example, rice flour. Conveniently, the inventive food supplement formulation may be taken orally at a dosage rate ranging from about 200 to about 2,000 milligrams per day. Preferably, the dosage rate is about 1,200 milligrams per day.

The invention is more easily comprehended by reference to the specific embodiments recited hereinabove which are representative of the invention. It must be understood, however, that the recited embodiments are provided for the purpose of illustration, and that the invention may be practiced otherwise than as specifically illustrated without departing from its spirit and scope.

What is claimed is:
1. A food supplement formulation, consisting essentially of:
   L-methionine;
   L-arginine;
   zinc;
   selenium;
   Echinacea;
   cranberry;
   ginkgo; and
   usnea barbata, wherein the formulation consists essentially of L-methionine, L-arginine, zinc, selenium, Echinacea, cranberry, ginkgo, and usnea barbata in an amount sufficient to improve the function of the human bladder.

2. The food supplement formulation according to claim 1, wherein the concentration of L-methionine ranges from about 0.5 to about 4 weight percent.

3. The food supplement formulation according to claim 1, wherein the concentration of L-arginine ranges from about 0.5 to about 4 weight percent.

4. The food supplement formulation according to claim 1, wherein the concentration of zinc ranges from about 0.5 to about 7 weight percent.

5. The food supplement formulation according to claim 1, wherein the concentration of selenium ranges from about 2 to about 18 weight percent.

6. The food supplement formulation according to claim 1, wherein the concentration of Echinacea ranges from about 3 to about 30 weight percent.

7. The food supplement formulation according to claim 1, wherein the concentration of cranberry ranges from about 20 to about 70 weight percent.

8. The food supplement formulation according to claim 1, wherein the concentration of ginkgo ranges from about 2 to about 12 weight percent.

9. The food supplement formulation according to claim 1, wherein the concentration of usnea barbata ranges from about 4 to about 22 weight percent.

10. The food supplement formulation according to claim 1, wherein the concentration of L-methionine is about 2 weight percent.

11. The food supplement formulation according to claim 1, wherein the concentration of L-arginine is about 2 weight percent.

12. The food supplement formulation according to claim 1, wherein the concentration of zinc is about 4 weight percent.

13. The food supplement formulation according to claim 1, wherein the concentration of selenium is about 4 weight percent.

14. The food supplement formulation according to claim 1, wherein the concentration of Echinacea is about 10 weight percent.

15. The food supplement formulation according to claim 1, wherein the concentration of cranberry is about 62 weight percent.

16. The food supplement formulation according to claim 1, wherein the concentration of ginkgo is about 4 weight percent.

17. The food supplement formulation according to claim 1, wherein the concentration of usnea barbata is about 12 weight percent.

18. A food supplement formulation, consisting essentially of:
  from about 0.5 to about 4 weight percent L-methionine;
  from about 0.5 to about 4 weight percent L-arginine;
  from about 0.5 to about 7 weight percent zinc;
  from about 2 to about 18 weight percent selenium;
  from about 3 to about 30 weight percent Echinacea;
  from about 20 to about 70 weight percent cranberry;
  from about 2 to about 12 weight percent ginkgo; and
  from about 4 to about 22 weight percent usnea barbata, wherein the formulation consists essentially of 0.5 to about 4 weight percent L-methionine, 0.5 to about 4 weight percent L-arginine, 0.5 to about 7 weight percent zinc, 2 to about 18 weight percent selenium, 3 to about 30 weight percent Echinacea, 20 to about 70 weight percent cranberry, 2 to about 12 weight percent ginkgo, and 4 to about 22 weight percent usnea barbata is adapted to improve the function of the human bladder.

19. The food supplement formulation according to claim 18, wherein the concentration of L-methionine is about 2 weight percent.

20. The food supplement formulation according to claim 18, wherein the concentration of L-arginine is about 2 weight percent.

21. The food supplement formulation according to claim 18, wherein the concentration of zinc is about 4 weight percent.

22. The food supplement formulation according to claim 18, wherein the concentration of selenium is about 4 weight percent.

23. The food supplement formulation according to claim 18, wherein the concentration of Echinacea is about 10 weight percent.

24. The food supplement formulation according to claim 18, wherein the concentration of cranberry is about 62 weight percent.

25. The food supplement formulation according to claim 18, wherein the concentration of ginkgo is about 4 weight percent.

26. The food supplement formulation according to claim 18, wherein the concentration of usnea barbata is about 12 weight percent.

27. A food supplement formulation, consisting essentially of:
  about 2 weight percent L-methionine;
  about 2 weight percent L-arginine;
  about 4 weight percent zinc;
  about 4 weight percent selenium;
  about 10 weight percent Echinacea;
  about 62 weight percent cranberry;
  about 4 weight percent ginkgo; and
  about 12 weight percent usnea barbata, wherein the formulation consists essentially of 2 weight percent L-methionine, 2 weight percent L-arginine, 4 weight percent zinc, 4 weight percent selenium, 10 weight percent Echinacea, 62 weight percent cranberry, 4 weight percent ginkgo, and 12 weight percent usnea barbata is adapted to improve the function of the human bladder.

* * * * *